United States Patent [19]
Huang

[11] Patent Number: 6,088,446
[45] Date of Patent: Jul. 11, 2000

[54] PROTECTION CIRCUIT FOR USE WITH A TELEPHONE APPLIANCE AND METHODS OF USE

[75] Inventor: Minsiu Huang, Saratoga, Calif.

[73] Assignee: Actiontec Electronics, Inc., Sunnyvale, Calif.

[21] Appl. No.: 09/073,921

[22] Filed: May 6, 1998

[51] Int. Cl.[7] .................................. H04M 11/00; H02H 3/26
[52] U.S. Cl. ......................... 379/412; 379/399; 379/413; 361/94
[58] Field of Search .................................. 379/412, 399, 379/413, 405, 93.05, 2, 27, 93.01, 93.06, 93.26, 93.28; 361/119, 56; 375/222

[56] References Cited

U.S. PATENT DOCUMENTS

| | | | |
|---|---|---|---|
| 3,903,375 | 9/1975 | DeWit | 179/18 |
| 4,317,964 | 3/1982 | Biggs et al. | 179/81 |
| 4,408,248 | 10/1983 | Bulley et al. | 361/91 |
| 4,456,940 | 6/1984 | Hammerberg et al. | 361/56 |
| 4,603,234 | 7/1986 | Huet et al. | 179/16 |
| 4,644,437 | 2/1987 | Robe | 361/56 |
| 4,709,296 | 11/1987 | Hung et al. | 361/102 |
| 4,723,267 | 2/1988 | Jones et al. | 379/93 |
| 4,758,920 | 7/1988 | McCartney | 361/119 |
| 4,862,309 | 8/1989 | Tojo et al. | 361/56 |
| 4,876,620 | 10/1989 | Borkowicz | 361/56 |
| 4,947,426 | 8/1990 | Montano | 379/412 |
| 4,947,427 | 8/1990 | Rosch et al. | 379/412 |
| 4,958,371 | 9/1990 | Damoci et al. | 379/377 |
| 5,042,065 | 8/1991 | Kim | 379/165 |
| 5,125,027 | 6/1992 | Blaszykowski et al. | 379/399 |
| 5,140,631 | 8/1992 | Stahl | 379/377 |
| 5,369,687 | 11/1994 | Farkas | 379/98 |
| 5,532,898 | 7/1996 | Price | 361/119 |
| 5,675,640 | 10/1997 | Tappert et al. | 379/373 |
| 5,696,660 | 12/1997 | Price | 361/119 |
| 5,777,836 | 7/1998 | Price et al. | 361/94 |
| 5,802,151 | 9/1998 | Bevill, Jr. et al. | 379/93.05 |
| 5,809,068 | 9/1998 | Johnson | 375/222 |

*Primary Examiner*—Forester W. Isen
*Assistant Examiner*—Jacques Saint-Surin
*Attorney, Agent, or Firm*—Fish & Neave; Nicola A. Pisano

[57] ABSTRACT

Protection circuitry for use with a modem is provided that detects excessive voltage between the tip and ring lines of a telephone subscriber loop when the modem is off-hook. When the over-voltage condition is detected, a switch is active, creating a circuit path that directs current away from the DC-holding circuit of the modem, thereby protecting the modem. The protection circuit of the present invention may be implemented using a minimal number of simple and inexpensive components.

26 Claims, 3 Drawing Sheets

PROTECTION CIRCUIT FOR USE WITH A TELEPHONE APPLIANCE AND METHODS OF USE

FIELD OF THE INVENTION

The present invention relates to protection of telephone equipment, such as modems, that use public and private telephone lines to communicate data between computers. More particularly, the present invention relates to a circuit for use in a Personal Computer Memory Card International Association (PCMCIA) modem card or a mobile modem (an internal modem used in a portable computer) that detects an over-voltage condition on a telephone subscriber line, and protects the modem circuitry from being damaged by the overvoltage condition.

BACKGROUND OF THE INVENTION

With the expansion of remotely-accessible public and private networks, users of personal computers are increasingly employing modem equipment to communicate data across public and private telephone lines. The ability to access a wide variety of data resources from nearly anywhere in the world is increasing the value of personal computers as tools for business and increasing the productivity of personal computer users.

As is well known, a "modem" is a device that interfaces a computer to a telephone line, and permits digital data to be communicated across a telephone line by modulating the outgoing digital data so that it is compatible with telephone networks designed to handle analog signals (e.g. speech traffic). Similarly, a modem demodulates incoming analog signals from a telephone line to recover digital data from the analog signals.

The need for telephone systems and equipment to be compatible and interchangeable has led to the development of physical and electrical standards for interfacing telephone equipment, such as modems, to public and private telephone networks. In the United States, the standard physical connector for telephone equipment is the RJ-11, 6-pin miniature module and plug. The standard cable used to connect telephone equipment to a telephone subscriber loop consists of two wires, which are referred to as "tip" and "ring". These two wires are typically connected to the center two leads of an RJ-11 plug at one end of the cable. The RJ-11 plug is typically plugged into an RJ-11 module in a telephone wall jack, which is connected to a telephone subscriber loop. The telephone equipment may be directly connected to the cable, or may be connected to the cable through an RJ-11 plug, or a proprietary connector.

The electrical interface between telephone equipment and the public telephone network has also been standardized, and in the United States, telephone equipment must meet standards promulgated by the Federal Communications Commission (FCC), and by various telephone companies. Manufacturers of telephone equipment must provide an electrical line interface circuit that moderates all signals that are sent over the public telephone network. The line interface circuit protects the public telephone lines and the public telephone network from damage, and thereby helps insure the integrity of transmissions over public telephone systems.

This line interface circuitry is referred to as Data Access Arrangement (DAA) circuitry that typically provides an impedance match between the telephone equipment and the telephone line, and also isolates and protects the telephone equipment from transient signals and other electrical signals that may be present on a telephone line. The DAA also protects the telephone network from any harmful signals that the telephone equipment may generate. Damage to the public telephone network may result, for example, if a modem accidentally injected direct current (DC) power into the telephone line. The FCC mandated DAA circuit does not permit the telephone equipment to transmit such damaging signals to the telephone network.

The DAA circuit typically includes a circuit, such as a diode bridge full-wave rectifier, that permits the DAA to function regardless of the polarity of the voltage on the tip and ring lines of the public telephone network. The DAA circuit also includes a DC-holding circuit and other circuitry that primarily conducts alternating current (AC) (referred to hereinafter as the DAA AC Circuitry). When the telephone equipment is off-hook, the DC-holding circuit keeps the telephone line active by providing a path for DC current while simultaneously presenting a high impedance to AC signals.

The telephone equipment in many offices, hotels, and other large facilities typically is not connected directly to the public telephone network. Rather, these facilities are increasingly wired so that telephone traffic passes through a "private branch exchange" (PBX). A PBX is an automatic switching system that interconnects the telephone equipment within a facility, and acts as a gateway between an internal telephone network and the public telephone network.

Although the connections between a PBX and the public telephone network must meet all of the applicable standards to prevent damage to the public telephone system, the connections between the PBX and internal telephone equipment are not required to meet these standards. Many PBX systems use wires connected to an RJ-11 plug in a manner different from the public telephone system. Some PBX systems use additional wires connected to the RJ-11 plug to transmit control information between the PBX and specialized telephone equipment designed to be used with that particular PBX.

Some PBX systems use the tip and ring lines to send control information, or to supply power to specialized telephone equipment in a manner that may damage telephone equipment that is not specially designed to work with the PBX. Consequently, the DAA circuitry in standard telephone equipment may be damaged or destroyed if the equipment is connected to a PBX having a non-standard wiring arrangement, or non-standard electrical characteristics.

Because the telephone jacks used with these PBX systems are typically RJ-11 modules, they are indistinguishable from a standard telephone jack. Thus, a personal computer user who connects a modem to a hotel or office telephone system may have no way of knowing if the PBX in use at the hotel or office will damage the modem. As increasing numbers of people connect portable computers equipped with modems to telephone lines in hotel rooms and other facilities that use PBX systems, the likelihood of such damage is considerable.

To prevent damage to the DAA circuitry, many modem manufacturers use a fuse-type device. When the modem is taken "off-hook" while connected to a PBX that supplies power over the tip and ring lines at too high a voltage or current, the fuse burns out, thereby protecting the DAA circuitry. Unfortunately, once a fuse burns out, it must be physically replaced before the modem again will function. Other fuse-like devices, such as circuit breaking devices may also be employed to protect the DAA line interface circuitry.

Use of fuses or other fuse-like devices to protect the DAA circuitry, however, has a number of drawbacks. First, these devices typically are slow to react. Thus, the DAA circuitry must be designed to handle excessive voltage or current until the fuse can react. If a fuse is used, the fuse must be positioned in such a way that it is easily accessible and replaceable, or the modem may have to be returned to the manufacturer, at considerable cost in time and money, to replace the fuse.

Although it is relatively easy to provide access to a fuse on a large external modem, it is much more difficult to provide such access on a compact modem, such as a modem conforming to the PCMCIA specifications, or a mobile modem. Most fuse-like devices, such as circuit breaking devices are too large to be used in a PCMCIA modem or mobile modem. Because PCMCIA modems and mobile modems typically are used with portable computers, which are most likely to be plugged into an unknown telephone system, some other protection means is needed.

U.S. Pat. No. 5,532,898 to Price describes one attempt to address the foregoing problems. That patent describes current sensing circuitry that generates a signal indicative of excessive line current. The signal is monitored by a microprocessor, that opens a relay when the line current exceeds a predetermined magnitude, thereby protecting the DAA line interface circuitry. The current sensing circuitry comprises numerous additional components separate from other modem and DAA line interface circuitry, and also requires a microprocessor programmed to respond to the "excessive line current" signal. U.S. Pat. No. 5,696,660, also to Price, has an identical written description and claims monitoring a supply voltage present across the telephone line. The patent does not describe circuitry for performing this function, however, but only describes circuitry for monitoring line current.

Apart from the complexity involved in sensing line current, line current may not always be a good indicator of potentially damaging power levels on the phone. Some DAA circuitry limits the current at a fixed level, but does not limit the voltage. Because power is the product of current and voltage, even if the current is limited, increases in the voltage may cause the power to rise to levels that may damage the line interface circuitry. Protection circuitry that senses only excessive line current will not detect this condition, and may allow the DAA line interface circuitry to be damaged.

In view of the above, it would be desirable to provide apparatus and methods for protecting DAA line interface circuitry from electrical conditions on a phone line that are appropriate for use in a PCMCIA modem or mobile modem.

It would also be desirable to provide apparatus and methods of protecting DAA line interface circuitry that monitors the voltage on a telephone line to determine the presence of over-voltage conditions.

It would further be desirable to provide apparatus and methods for monitoring the voltage on a telephone line that operates quickly and independently of other circuitry, and that may be constructed using a minimum number of simple components.

SUMMARY OF THE INVENTION

It is an object of the present invention to provide apparatus and methods for protecting DAA line interface circuitry from electrical conditions which may be present on a telephone line.

It is also an object of the present invention to provide apparatus and methods of protecting DAA line interface circuitry that monitors the voltage on a telephone line to determine the presence of over-voltage conditions.

It is a further object of the present invention to provide circuitry for monitoring the voltage that operates quickly and independently of other circuitry, and that may be constructed using a minimum number of simple components.

These and other objects of the present invention are achieved by providing circuitry disposed between the polarity guard and the DC-holding circuitry of previously known telephone equipment to detect an over-voltage condition between the tip and ring lines when the modem is off-hook. When such an over-voltage condition is detected, the circuitry automatically reduces current on the telephone line to a negligible amount, and therefore protects the DAA line interface circuitry.

In a first embodiment, this is achieved using a voltage divider arrangement connected to a transistor. When the voltage between tip and ring rises above a predetermined voltage, the divided voltage at the transistor rises to a voltage level sufficient to turn ON the transistor and turn OFF the DC-holding circuit to protect the DAA line interface circuitry.

Alternative embodiments use a zener diode or a comparator to perform a similar voltage detection function.

BRIEF DESCRIPTION OF THE DRAWINGS

The above and other objects and advantages of the present invention will be apparent upon consideration of the following detailed description, taken in conjunction with the accompanying drawings, in which like reference characters refer to like parts throughout, and in which.

DETAILED DESCRIPTION OF THE INVENTION

Figure 1:
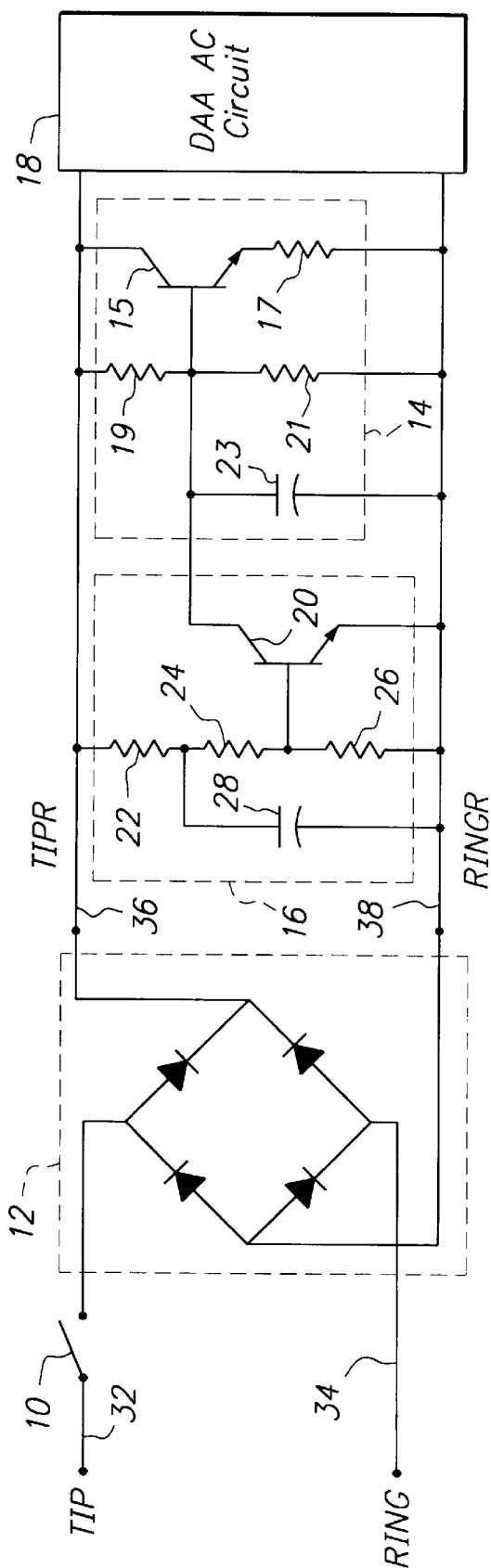
FIG. 1 is a schematic representation of a protection circuit constructed in accordance with the principles of the present invention.

Referring to FIG. 1, a first embodiment of the protection circuit of the present invention, coupled to a portion of the DAA line interface circuitry of a modem, is described. Switch 10, preferably a relay, determines the on-hook/off-hook status of the modem, diode bridge 12 rectifies the signals on tip line 32 and ring line 34 when switch 10 is off-hook, DC-holding circuitry 14 provides a path for DC current when switch 10 is off-hook, and protection circuit 16 protects DC-holding circuitry 14 from over-voltage conditions, as described hereinbelow. DC-holding circuitry 14 illustratively comprises resistors 17, 19, and 21, capacitor 23, and transistor 15.

During normal operation, when the modem is on-hook, switch 10 is open, and a DC voltage of approximately 48 volts (50 volts in some countries) is present between tip line 32 and ring line 34. In this state, no current flows through protection circuit 16, DC-holding circuitry 14, or DAA AC circuitry 18.

When the central telephone office or PBX alerts the modem to an incoming call, it sends a ring signal on the telephone line. This ring signal appears as an AC signal with 30 to 150 volts peak-to-peak (Vp-p) at a frequency of approximately 20 cycles per second (Hz) between tip line 32 and ring line 34. Because switch 10 is open, protection circuit 16, DC-holding circuitry 14, and DAA AC circuitry 18 are inactive. The modem responds to the ring signal by closing switch 10, taking the modem off-hook. The modem may also be taken off-hook if a user instructs the modem to initiate a call.

When the modem is taken off-hook, the voltage between tip line 32 and ring line 34 drops to approximately 6 to 11 volts, and an analog signal representing the data being transmitted and received may be present between the lines. Diode bridge 12 provides rectified outputs TIPR 36 and RINGR 38 that are full-wave rectified versions of the signals present at tip line 32 and ring line 34, respectively. The voltage difference between TIPR 36 and RINGR 38, however, is approximately 1.2 volts less than the voltage difference between tip line 32 and ring line 34. In this state, protection circuit 16, DC-holding circuitry 14, and DAA AC circuitry 18 receive current, and are active. Once the circuit has settled (which typically takes 100 ms or less), DC-holding circuitry 14 presents a high impedance to AC signals, and a relatively low impedance to DC signals.

Protection circuit 16 functions by determining the voltage between TIPR 36 and RINGR 38, and by shutting down parts of DC-holding circuitry 14 if the voltage exceeds a predetermined voltage level (preferably approximately 12 volts).

This is achieved in the embodiment of FIG. 1 using resistors 22, 24 and 26, disposed in series between TIPR 36 and RINGR 38 to form a voltage divider. The base terminal of transistor 20 is connected between resistors 24 and 26. Transistor 20 switches to an active state when the voltage at the base terminal exceeds the ON-voltage of transistor 20, typically approximately 0.7 volts. Resistors 22, 24 and 26 have resistance values such that the voltage at a point between resistors 24 and 26 exceeds the ON-voltage of transistor 20 only when the voltage between TIPR 36 and RINGR 38 exceeds the predetermined voltage level. The combined resistance of resistors 22, 24 and 26 is also preferably sufficiently high that protection circuit 16 only draws a small amount of current. In a preferred embodiment, resistors 22, 24 and 26 have resistance values of 680 K-ohms, 270 K-ohms and 47 K-ohms, respectively.

When the voltage at a point between resistors 24 and 26 exceeds the ON-voltage of transistor 20, transistor 20 switches to an active state. When this occurs, the voltage between the collector and emitter of transistor 20 drops to less than about 1 volt, which effectively shuts down DC-holding circuitry 14. Additionally, the collector of transistor 20 pulls most of the current flow away from DC-holding circuit 14, thereby protecting DC-holding circuitry 14.

Capacitor 28 delays protection circuit 16, permitting DC-holding circuit 14 to settle after the modem is taken off-hook before protection circuit 16 starts functioning. During this initial settling time (preferably 100 ms or less), the voltage between TIPR 36 and RINGR 38 may be higher than the predetermined voltage level without presenting a significant risk of damaging DAA AC circuitry 18. The capacitance value of capacitor 28 depends on the settling time for DC-holding circuit 14, and preferably is 1 µF.

As illustrated in FIG. 1, relatively few and inexpensive components are required to implement the protection circuit of the present invention: three resistors, a capacitor, and a transistor. Additionally, the circuit of the present invention operates in a completely automatic manner. Unlike previously known over-current detection circuits, such as described in the foregoing patents to Price, no additional control lines, processor or programming changes are required.

Figure 2:
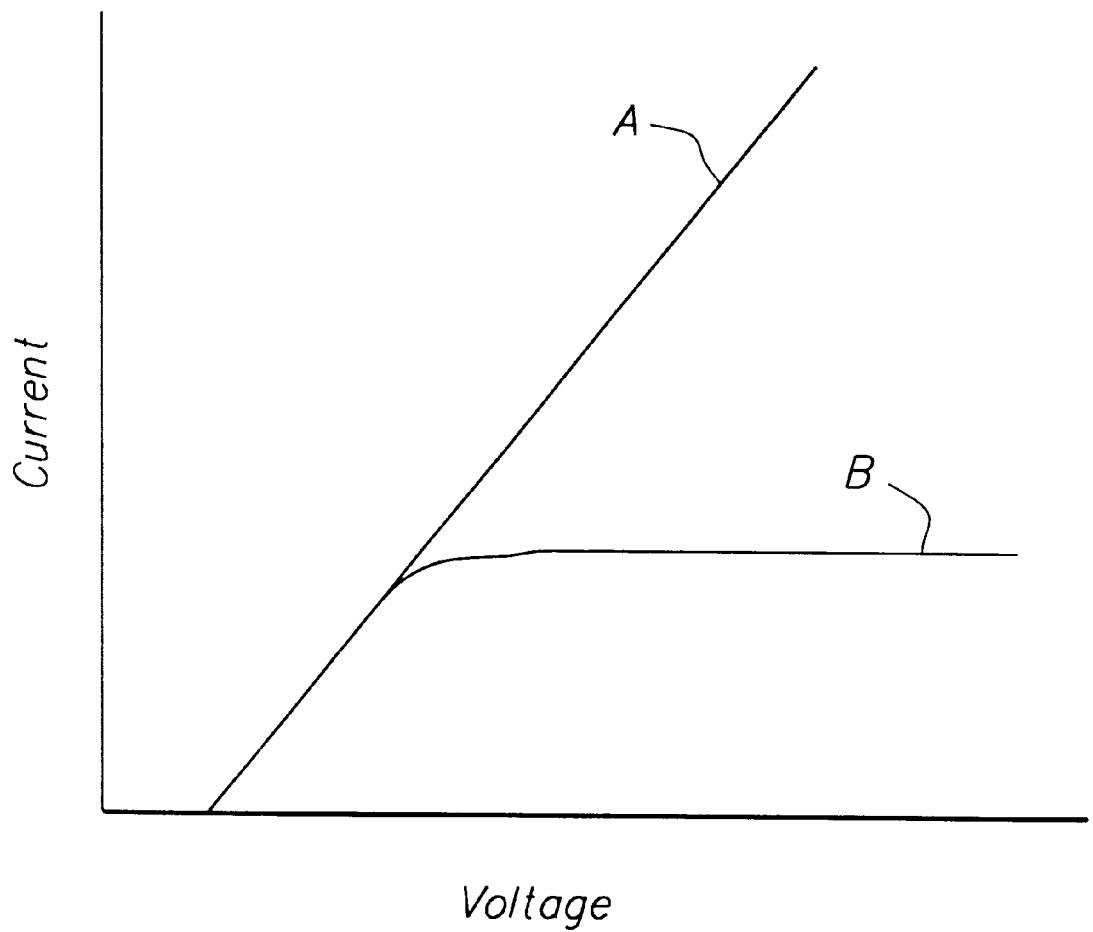
FIG. 2 is a graph showing a relationship between increases in voltage and in current using two different DAA line interface designs.

Advantageously, by sensing the voltage between TIPR 36 and RINGR 38, which is approximately 1.2 volts less than the voltage between tip line 32 and ring line 34, the protection circuit of the present invention prevents damage to the DAA line interface circuit even in situations where the loop current is limited. For example, as illustrated in FIG. 2, different DAA line interface circuitry designs may behave differently as the voltage between the tip and ring lines is increased. In the case of the circuitry characterized by curve A, the current increases as the voltage increases. The DAA circuitry may be damaged if too much power is applied. Because power is the product of voltage and current, for DAA line interface circuitry of the type that may be characterized by curve A, it is sufficient to detect either the loop current or the voltage between the tip and ring lines to determine when damage may occur.

In the DAA line interface circuitry characterized by curve B, the current increases as the voltage increases only until a current limit is reached. The voltage between the tip and ring lines may continue to increase, but the loop current remains approximately constant. As the voltage increases, the power (current×voltage) increases, potentially damaging the DAA line interface circuitry. This condition cannot be detected by simply sensing the loop current, because the current will not increase beyond the limit. The condition therefore only may be detected by sensing the voltage between the tip and ring lines, for example, the voltage between lines TIPR 36 and RINGR 38, as in the protection circuit of the present invention.

Figure 3:
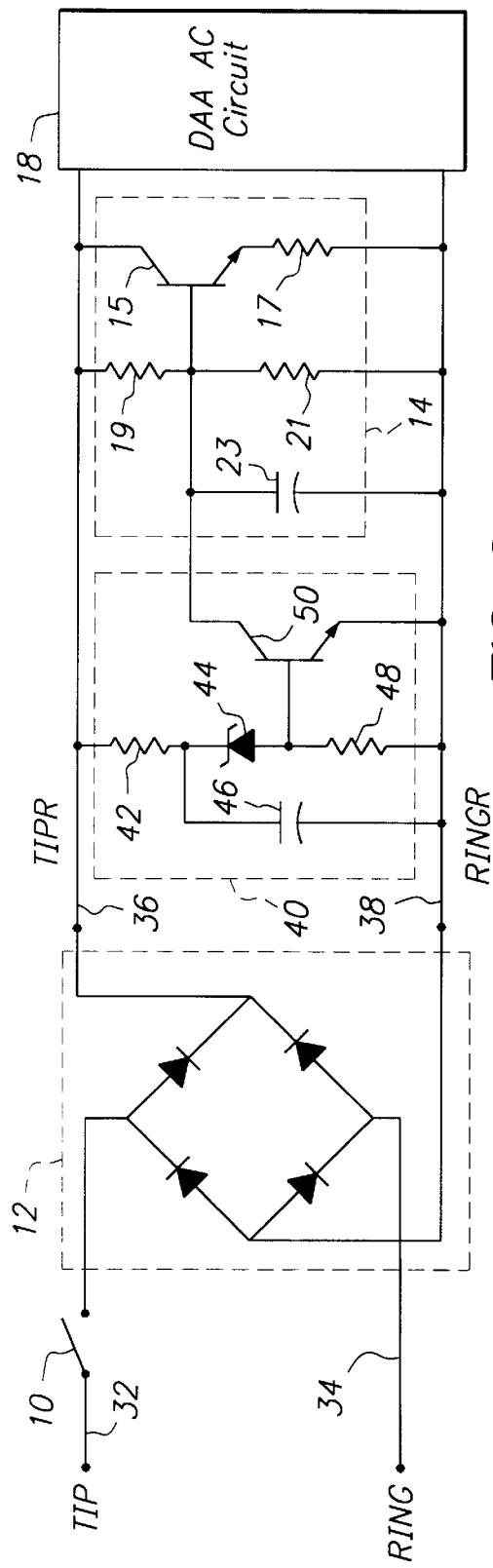
FIGS. 3 and 4 are schematic representations of alternative embodiments of the protection circuit of the present invention.

With respect to FIG. 3, an alternative embodiment of the protection circuit of the present invention is described. Protection circuit 40 uses zener diode 44 to detect the presence of an over-voltage condition. If the voltage between TIPR 36 and RINGR 38 is greater than the breakdown voltage of zener diode 44 (preferably approximately 12 V), current flows through the zener diode, and transistor 50 becomes active. When this occurs, the voltage between the collector and emitter of transistor 50 drops to less than about 1 volt, which effectively shuts down DC-holding circuitry 14. Additionally, the collector of transistor 50 pulls most of the current flow away from DC-holding circuit 14, thereby protecting DC-holding circuitry 14.

Resistor 42 serves to protect zener diode 44 from excessive current during an over-voltage condition, and resistor 48 provides a voltage drop between the base and emitter of transistor 50. As in the embodiment of FIG. 1, capacitor 46 delays operation of protection circuit 40 until the DC-holding circuitry has settled.

Figure 4:
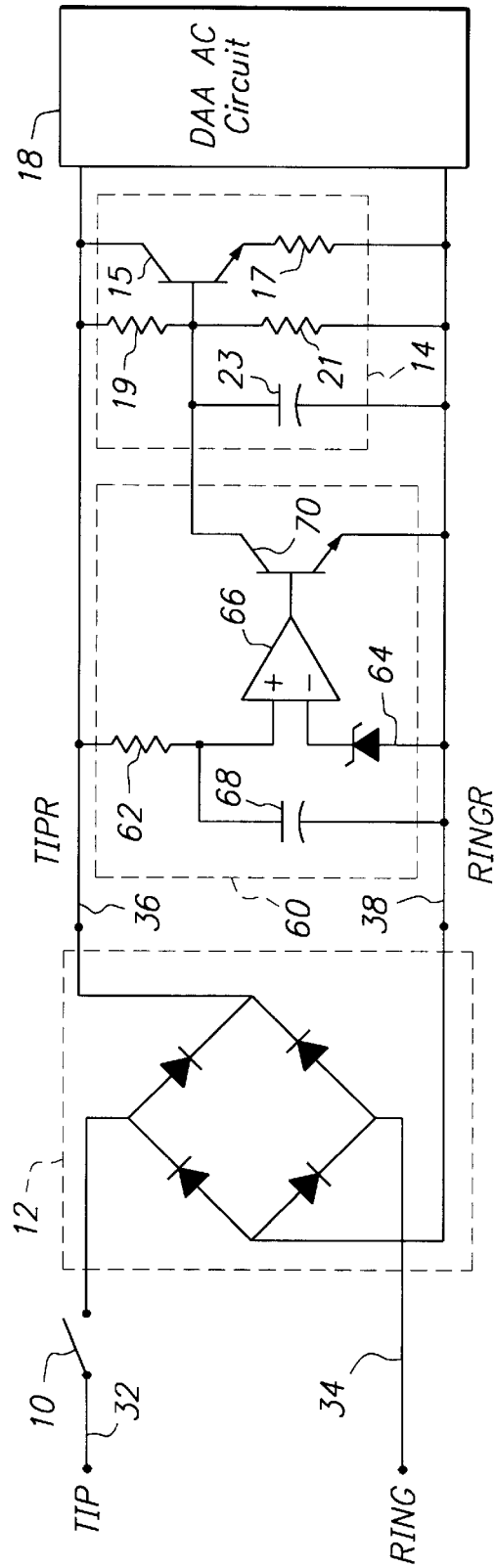

With respect to FIG. 4, a further alternative embodiment of the protection circuit of the present invention is described. Protection circuit 60 employs comparator 66 to determine when the voltage between TIPR 36 and RINGR 38 has exceeded a predetermined threshold. The positive terminal of comparator 66 is coupled through resistor 62 to TIPR 36. The negative terminal of the comparator is connected to RINGR 38 through zener diode 64, which provides a reference voltage (preferably approximately 12 volts). If the voltage between TIPR 36 and RINGR 38 exceeds the reference voltage, comparator 66 outputs a logic "HIGH" (typically 5 volts), causing transistor 70 to direct current away from DC-holding circuitry 14.

Resistor 62 serves to protect comparator 66 from excessive current during an over-voltage condition. As in the embodiment of FIG. 1, capacitor 68 delays operation of protection circuit 60 until the DC-holding circuitry has settled.

Although preferred illustrative embodiments of the present invention are described above, it will be evident to one skilled in the art that various changes and modifications may be made without departing from the invention. For example, slight changes could be made to the values or arrangements of the components, slightly different circuitry could be used to detect the voltage between the tip and ring lines, or a different type of transistor or switching means could be used to direct current away from the DC-holding circuit. It is intended in the appended claims to cover all such changes and modifications which fall within the true spirit and scope of the invention.

What is claimed is:

1. Protection circuitry for use in a telephone device having line interface circuitry including DC-holding circuitry adapted to be coupled to a telephone line, the protection circuitry comprising:
    a hook switch that selectively places the telephone device in an on-hook state or an off-hook state, the protection circuitry and DC-holding circuitry being inactive when the telephone device is in the on-hook state;
    voltage sensing circuitry coupled across the telephone line and connected to the DC-holding circuitry, the voltage sensing circuitry indicating an over-voltage condition on the telephone line when the telephone device is in the off-hook state and the voltage on the telephone line exceeds a predetermined voltage level; and
    switching circuitry coupled to the voltage sensing circuitry, the switching circuitry switching from an OFF state to an active state when the over-voltage condition is indicated, wherein current is directed away from the DC-holding circuitry when the switching circuitry is in the active state.

2. The protection circuitry of claim 1, wherein the voltage sensing circuitry comprises voltage divider circuitry, and the switching circuitry switches from the OFF state to the active state when a divided voltage exceeds an ON-voltage level.

3. The protection circuitry of claim 2, wherein the voltage divider circuitry comprises at least two resistors connected in series.

4. The protection circuitry of claim 3, wherein the switching circuitry comprises a transistor having a base terminal, the base terminal electrically connected to a point between two of the resistors.

5. The protection circuitry of claim 4, wherein the ON-voltage level is an ON-voltage of the transistor.

6. The protection circuitry of claim 1, wherein the voltage sensing circuitry comprises a zener diode having a breakdown voltage above which current flows through the zener diode in a reverse direction.

7. The protection circuitry of claim 6, wherein the predetermined voltage level is determined by the breakdown voltage of the zener diode.

8. The protection circuitry of claim 1, wherein the voltage sensing circuitry comprises a comparator and a voltage reference, and the predetermined voltage level is determined by the voltage reference.

9. The protection circuitry of claim 8, wherein the voltage reference comprises a zener diode.

10. The protection circuitry of claim 1, wherein the telephone device comprises a modem.

11. The protection circuitry of claim 10, wherein the modem comprises an internal modem for use in a portable computer.

12. The protection circuitry of claim 10, wherein the modem conforms to a specification of a PCMCIA card.

13. Protection circuitry for use in a modem, the modem electrically coupled to an external telephone subscriber line having a tip and a ring line, the modem including line interface circuitry having a full wave rectifier and DC-holding circuitry, and a hook switch that selectively places the modem in an off-hook state or an on-hook state, wherein the line interface circuitry and the protection circuitry are inactive when the modem is in the on-hook state, the modem adapted to be coupled between the tip line and the ring line, the protection circuitry comprising:
    voltage sensing circuitry, connected to the DC-holding circuitry, the voltage sensing circuitry indicating an over-voltage condition when the modem is off-hook and the voltage between the tip and ring lines exceeds a predetermined voltage level; and
    switching circuitry coupled to the voltage sensing circuitry, the switching circuitry switching from an OFF state to an active state and directing current away from the DC-holding circuitry when the over-voltage condition is indicated.

14. The protection circuitry of claim 13, wherein the voltage sensing circuitry comprises voltage divider circuitry coupled between the tip and ring lines, and the switching circuitry switches from the OFF state to the active state when the divided voltage exceeds a switching voltage level.

15. The protection circuitry of claim 14, wherein the voltage divider circuitry comprises at least two resistors disposed in series.

16. The protection circuitry of claim 15, wherein the switching circuitry comprises a transistor having a base terminal electrically connected to a point between two of the resistors.

17. The protection circuitry of claim 16, wherein the switching voltage level is the switching voltage of the transistor.

18. The protection circuitry of claim 13, wherein the voltage sensing circuitry comprises a zener diode coupled between the tip and ring lines, the zener diode having a breakdown voltage above which current flows through the zener diode in a reverse direction.

19. The protection circuitry of claim 18, wherein the predetermined voltage level is determined by the breakdown voltage of the zener diode.

20. The protection circuitry of claim 13, wherein the voltage sensing circuitry comprises a comparator having a positive terminal coupled to the tip line, and a negative terminal coupled to a voltage reference, the voltage reference coupled to the ring line, and the predetermined voltage level is determined by the voltage reference.

21. The protection circuitry of claim 20, wherein the voltage reference comprises a zener diode.

22. The protection circuitry of claim 13, wherein the modem comprises a mobile modem for use in a portable computer.

23. The protection circuitry of claim 13, wherein the modem conforms to a specification of a PCMCIA card.

24. A method of protecting line interface circuitry of a modem connected to a telephone line, the method comprising:
    detecting an over-voltage condition only when the modem is off-hook and the voltage on the telephone line exceeds a predetermined voltage level; and
    directing current away from the line interface circuitry when the over-voltage condition is detected.

25. The method of claim 24, wherein directing current away from the line interface circuitry comprises creating a circuit path that directs current away from the line interface circuitry.

26. The method of claim 25, wherein creating a circuit path comprises changing a switch from an OFF state to an active state.

* * * * *